United States Patent [19]

Goldstein

[11] Patent Number: 4,856,031
[45] Date of Patent: Aug. 8, 1989

[54] ADAPTIVE MULTIHARMONIC PHASE JITTER COMPENSATION

[75] Inventor: Yuri Goldstein, Southbury, Conn.

[73] Assignee: General DataComm, Inc., Middlebury, Conn.

[21] Appl. No.: 187,285

[22] Filed: Apr. 28, 1988

[51] Int. Cl.$^4$ .......................... H04L 7/00; H04L 25/36
[52] U.S. Cl. ...................................... 375/118; 375/11; 364/724.19
[58] Field of Search ........................ 375/11, 12, 14, 15, 375/118; 333/18, 28 R; 364/724

[56] References Cited

U.S. PATENT DOCUMENTS

| | | | |
|---|---|---|---|
| 4,253,184 | 2/1981 | Gitlin | 375/118 |
| 4,320,526 | 3/1982 | Gitlin | 375/118 |
| 4,550,415 | 10/1985 | DeBus, Jr. et al. | 375/1 X |
| 4,575,857 | 3/1986 | Murakami | 375/12 |
| 4,635,276 | 1/1987 | Karabinis | 375/15 |
| 4,644,562 | 2/1987 | Kavehrad et al. | 375/14 |
| 4,730,341 | 3/1988 | Saito | 375/11 |

*Primary Examiner*—Robert L. Griffin
*Assistant Examiner*—Stephen Chin
*Attorney, Agent, or Firm*—David P. Gordon

[57] ABSTRACT

A multiharmonic adaptive phase jitter compensator for a high speed modem is provided. The compensator includes an IIR filter for each harmonic of phase jitter for which compensation is desired. The coefficient update of each IIR filter as well as the input to the primary jitter frequency IIR receives identical information from a phase detector which compares an equalized phase corrected signal entering a decision means with the ideal point determined by the decision means. However, the IIRs for the higher harmonics are trained with different information. Thus, the primary jitter frequency as adaptively determined by the first IIR is fed to harmonic computation circuitry. The harmonic computation circuitry then provides an adapted second harmonic to the second harmonic IIR, and adapted third harmonic to the third harmonic IIR, etc. The outputs of all the IIRs are summed, and the cosine and sine of the sum are provided to phase correct the equalized signal before it enters the decision circuitry.

9 Claims, 3 Drawing Sheets

ADAPTIVE MULTIHARMONIC PHASE JITTER COMPENSATION

BACKGROUND

This invention relates to the correction of phase jitter which is experienced by digital data signals during transmission over media of limited frequency bandwidth. More particularly, this invention relates to phase jitter correction via the use of a multiharmonic adaptive phase compensator.

It has been well known in the art for some time to utilize limited frequency band channels for the transmission of data over telephone voice lines. Recently, the technology has advanced to the point where transmission of data at 14,400 and even 19,200 bits of data per second is accomplishable. In providing such high data rates it has been necessary to increase the number of points in the transmitted constellation while maintaining the same average power. With more constellation points, it has become advisable to correct for and/or eliminate as many impairments as possible because given the identical bit rate and amount of noise and impairments, fewer errors would be expected to occur in a system with fewer constellation points. In other words, the closer the constellation points are one to the other, the smaller is the transmission impairment which will cause an error.

In the modems of the art, it is well known that an incoming signal is demodulated and phase corrected. The so-corrected signal is then passed to circuitry which decides to which constellation point it corresponds. By comparing in a phase detector the complex signal being fed into the decision circuitry and the complex signal put out by the decision circuitry, a waveform representative of the phase may be obtained. The resulting phase waveform may then be fed back via a phase jitter canceller to the phase corrector which corrects the phase of the incoming signal.

It will be appreciated that the phase waveform resulting from the comparison of the complex signals may be said to take the form of:

$$\Psi = \alpha \sin(w_j t + \Phi) + n(t) \quad (1)$$

where $\Delta \alpha$ is the amplitude of the phase deviation in degrees or radians, $w_j$ is the jitter frequency, $\Phi$ is the initial phase, and $n(t)$ is the noise. In correcting for phase jitter, it is evident that it is desirable to drive the phase $\Psi$ to zero. Indeed, various approaches which attempt to accomplish this correction are known in the art. For example, in U.S. Pat. No. 4,320,526 to Gitlin, an adaptive phase jitter compensator seen in FIG. 1 is provided. The compensator 20 obtains signals which are sent to decision circuitry 22, conducts in phase detector 24 a phase comparison on the incoming signals with the complex signals output by the decision circuitry 22, and sends the determined phase error to the input 26 and the coefficient update 28 of an adaptive infinite impulse response filter 30 which is essentially comprised of a finite impulse response filter 32 with feedback 34. The IIR 30, in accord with techniques well known in the art automatically tunes itself to the predominant phase jitter frequency and provides a signal indicative of the predominant phase jitter frequency and amplitude of the phase jitter. The sine and cosine of the output signal of the IIR (itself a sine wave) are then taken at means 36 such that when the values are multiplied by the equalized signal, the complex equalized signal is corrected and the phase error minimized. Thus, the IIR provides a signal with automatically adjusted amplitude, phase, and frequency.

A second arrangement for phase jitter compensation is seen in FIG. 2 herein which substantially amounts to an equivalent arrangement of that described in U.S. Pat. No. 4,253,184 to Gitlin et al. In FIG. 2, it is seen that a digital oscillator 50 is provided and outputs the sine and cosine function for a given frequency and for second and third harmonics of the same. The sine and cosine functions for each harmonic are input into adaptive amplitude-phase correctors 52a, 52b, and 52c which also receive phase comparison information from a phase detector 54 which compares signals which are sent to decision circuitry 56 with the complex signals output by the decision circuitry 56. Given set frequencies $w_j$, $2w_j$ and $3w_j$, the adaptive correctors 52 adjust the amplitude and initial phase so as to minimize the output of phase detector 54.

While the adaptive phase jitter compensation arrangement of U.S. Pat. 4,320,526 does provide some phase correction, it will be appreciated that the provided arrangement assumes that all of the phase jitter is first order; i.e. that the phase jitter does not include any harmonics. When even small amounts of harmonics of the phase jitter frequency are present, however, the performance of the provided arrangement degrades significantly. On the other hand, while the phase jitter compensation arrangement of U.S. Pat. No. 4,253,184 does account for harmonics and permits the phase and amplitude of the jitter to be adaptively found, the arrangement assumes a particular frequency for the jitter. However, if the jitter frequency is not known in advance, the compensation technique of U.S. Pat. No. 4,253,184 cannot be implemented because it requires pretuning; i.e. it is not adaptive to jitter frequency.

Further, it should be appreciated that while a first arrangement provides a means for adapting to the frequency, amplitude and initial phase of the phase jitter, and a second arrangement provides a means for accounting for the phase jitter harmonics, the two arrangements cannot be easily combined. For example, the combination which would suggest itself would be to use additional adaptive IIR filters of U.S. Pat. No. 4,320,526 in the parallel arrangement of U.S. Pat. No. 4,253,184, with the phase error as decided by the phase detector as the input into each IIR filter in order to cancel the second and third harmonics. However, in providing such an arrangement, all three filters interact with each other and the entire system becomes unstable.

SUMMARY OF THE INVENTION

It is therefore an object of this invention to provide a multiharmonic adaptive phase jitter compensator.

It is a further object of the invention to provide a stable multiharmonic adaptive phase jitter compensator where second and third harmonics of an adaptively found fundamental phase jitter frequency are used as driving inputs to second and third IIRs.

In accord with the objects of the invention, a multiharmonic adaptive phase jitter compensator for a high speed modem generally comprises:

(a) a primary filter means having an input, a coefficient update means, and an output, wherein the primary filter means is arranged to receive at its input and at its coefficient update means an error signal from a phase detector which compares an equalized phase corrected signal entering a decision means with the signal exiting the decision means, and wherein the primary filter means is arranged to adaptively provide at its output a wave indicative at least of the fundamental phase jitter frequency of the signal entering the decision means;

(b) harmonic derivation means connected to the output of the primary filter means for obtaining at least one non-fundamental harmonic of the phase jitter frequency provided by the first filter means;

(c) at least one secondary filter means, each secondary filter means having an input, a coefficient update means, and an output, wherein a particular non-fundamental harmonic is provided by the harmonic derivation means to an input of a corresponding particular secondary filter means while said error signal is provided to the coefficient update of each secondary filter means; and (d) summation means connected to outputs of said primary and secondary filter means for summing the outputs and applying the sum to a multiplier which multiplies a function of the sum with the equalized signals to provide a equalized and phase corrected signal which is sent to the decision means.

Preferably, the filter means are infinite impulse response filters (IIRs), and at least second and third IIRs are provided. The second IIR is supplied with the second harmonic and the third IIR is supplied with the third harmonic of the fundamental phase jitter frequency by the harmonic derivation means. The second and third harmonics train the IIRs to look for and correct for the second and third harmonics in the error signal. The second harmonic is essentially obtained by multiplying the output of the primary IIR (A sin $w_j t$) by itself to provide a value $A^2/2 - (A^2/2) \cos 2w_j t$, and by filtering to remove the d.c. component. The third harmonic is preferably obtained by cubing the output of the primary IIR to obtain $0.75 A^3 \sin w_j t - 0.25 A^3 \sin 3 w_j t$, and subtracting therefrom the product of the primary IIR output and a scaled d.c. component of the square of the primary IIR output.

A better understanding of the invention, and additional advantages and objects of the invention will become apparent to those skilled in the art upon reference to the detailed description and the accompanying drawings.

DETAILED DESCRIPTION OF THE PREFERRED EMBODIMENTS

Figure 1:
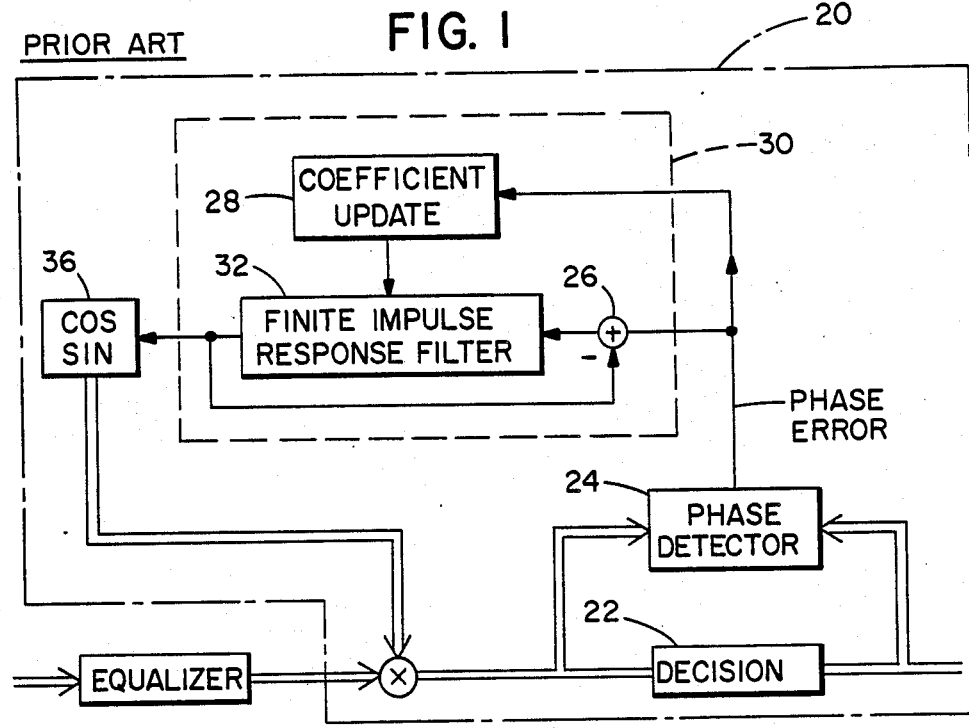
FIG. 1 is a block diagram of an adaptive phase jitter compensator of the art.
Figure 2:
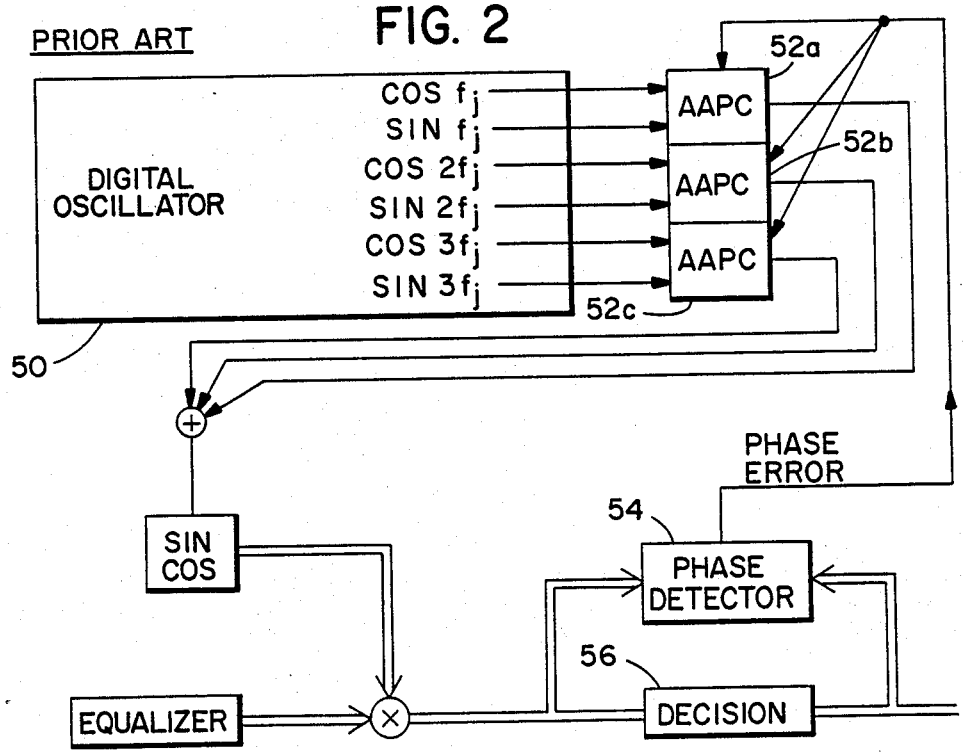
FIG. 2 is a block diagram of an equivalent to a phase jitter compensator of the art which compensates for harmonics.
Figure 3:
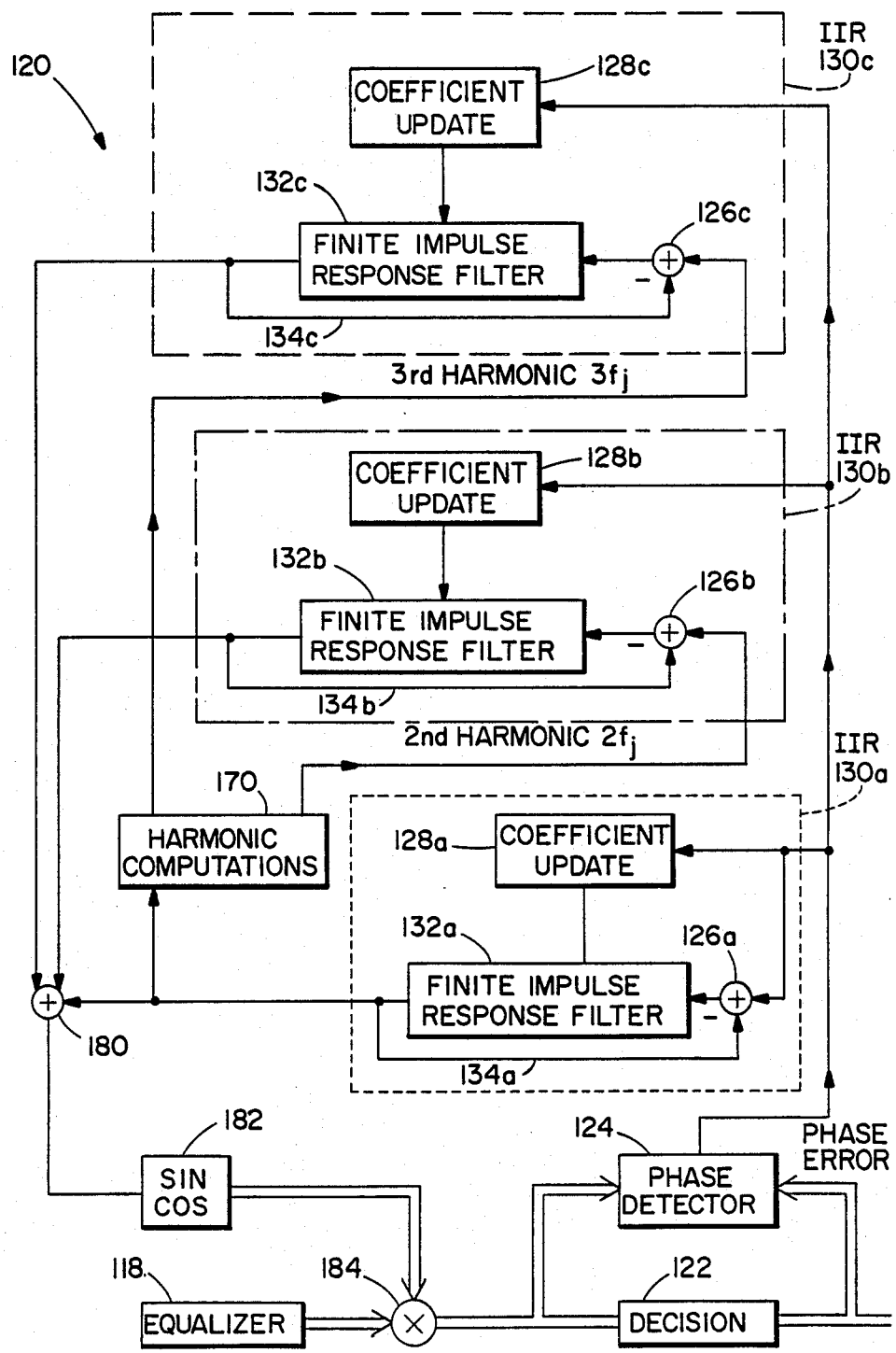
FIG. 3 is a block diagram of the multiharmonic adaptive phase jitter compensator of the invention.

Turning to FIG. 3, a block diagram of the preferred multiharmonic adaptive phase jitter compensator is seen. As with the adaptive compensator of the art shown in FIG. 1, the compensator 120 of FIG. 3 obtains signals which are sent from an equalizer 118 which with other circuitry known to those skilled in the art (not shown) corrects for constant phase shift and frequency offset to decision circuitry 122. Phase detector 124 is provided to conduct a phase comparison on the incoming signals with the complex signals output by the decision circuitry 122. The signal resulting from the phase comparison information is then fed as an input into an adaptive infinite impulse response filter 130a (the "primary filter") which is essentially comprised of a finite impulse response filter 132a with feedback 134a, a summing junction 126a for the feedback and the filter input signal, and a coefficient update means 128a for the tap coefficients of filter 132a. Not only is the phase comparison signal sent to the summing junction 126a, but it is also sent to the coefficient update 128a of the primary filter. The phase comparison signal is further sent to the coefficient updates 128b and 128c of infinite impulse response filters 130b and 130c (the "secondary filters"). However, as will be described hereinafter, the phase comparison signal is not sent as an input (i.e. to the summing junctions) to the secondary filters.

When fed with the phase comparison information, the IIR 130a, automatically tunes itself to the predominant (fundamental) phase jitter frequency (i.e. the phase jitter frequency having the highest amplitude; the "first harmonic") and provides in response thereto an output wave signal 136a of a single frequency of the form $A_1 \sin (w_j t + \Phi_j)$, where $A_1$ is the amplitude of the phase jitter, $w_j$ is the fundamental phase jitter frequency, and $\Phi_j$ is the phase offset. The output signal 136a of the IIR is fed to a harmonic derivation means 170 which computes at least one non-fundamenal harmonic of the predominant phase jitter frequency according to means which are discussed hereinafter with reference to FIG. 4. The higher harmonics are then sent to the summing junction inputs 126b and 126c of IIR filters 130b and 130c which are further comprised of finite impulse response filters 132b and 132c, feedback paths 134b and 134c, and coefficient updates 128b and 128c respectively. With the higher harmonics being supplied as the inputs to the IIRs 130b and 130c, and with the phase comparison information from the phase detector 124 being supplied to the coefficient updates 128b and 128c, IIRs 132b and 132c tune themselves to their particular harmonics and provide output waves 136b and 136c which are indicative of the phase and amplitude of the harmonic frequencies of the jitter. The outputs from IIRs 130a, 130b and 130c are then summed by summation means 180, and the sine and cosine of the sum is obtained at generator 182. The sine and cosine of the sum are then applied by a multiplier 184 as a corrective signal to the signals (which include phase jitter) being sent from equalizer 118 to decision means 122.

According to the preferred embodiment at least second and third IIRs 130b and 130c are provided to correct for phase jitter. It will be recognized, however, that if desired, additional IIRs trained to the fourth and succeeding harmonics could be provided if desired.

Figure 4:
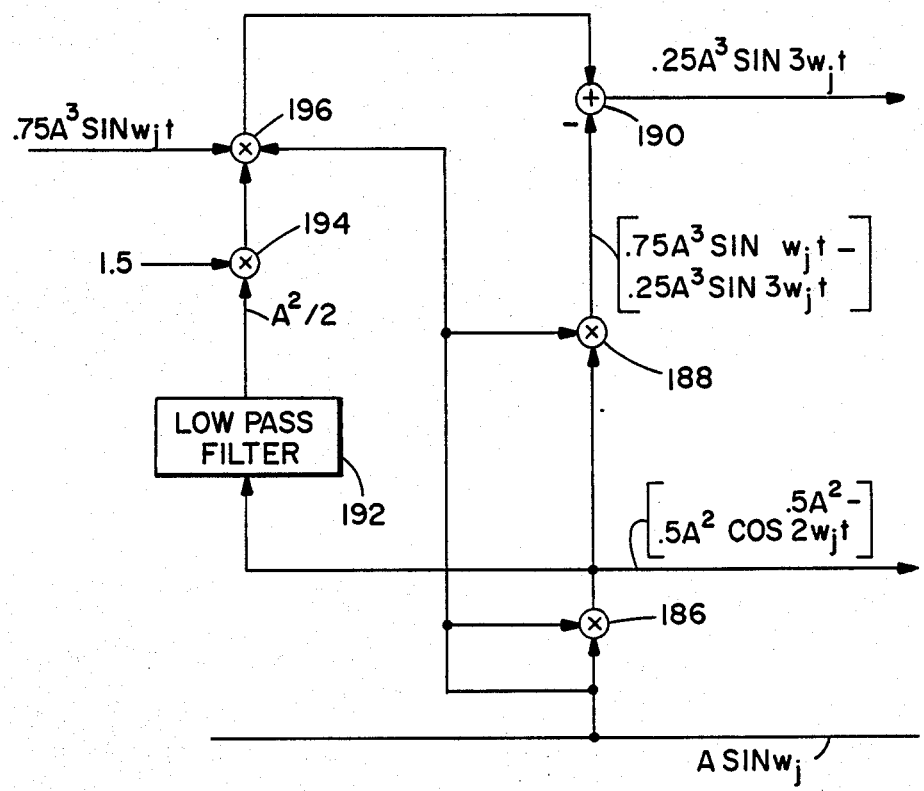
FIG. 4 is a schematic diagram of the harmonic computator of the multiharmonic adaptive phase jitter compensator of FIG. 3.

Turning to FIG. 4, the preferred manner of supplying the second and third harmonic signals to the secondary IIRs 130b and 130c is seen. If the output signal from primary IIR 130a is taken as A sin $w_j t$, multiplier 186 is used to provide the second harmonic. Thus, by squaring the primary output signal, it will be seen that by simple trigonometric identity, the value $(A^2/2)(1-\cos 2 w_j t)$ is obtained. By filtering, the d.c. component of the signal may be removed, and the remaining signal is a function of twice the fundamental harmonic frequency. The remaining signal may then be provided as the input to the IIR 130b. It will be recognized that as the output from primary IIR 130a changes (adapts), the input signal into IIR 130b will also adapt.

The third harmonic signal is preferably obtained by cubing the output of the primary IIR (multiplying at multiplier 188 the output signal from primary IIR 130a by the squared value of the primary IIR 130a obtained at multiplier 186) to obtain $0.75A^3 \sin w_jt - 0.25A^3 \sin 3w_jt$, and subtracting therefrom at summing means 190 the product of the primary IIR 130a output and a scaled d.c. component of the square of the primary IIR output ($0.75A^3 \sin w_jt$). The product of the primary IIR 130a output and a scaled d.c. component of the square of the pimary IIR output is obtained by using a low pass filter 192 to filter the signal obtained at multiplier 186 (thus obtaining the value $A^2/2$), scaling the obtained d.c. component by multiplying at multiplier 194 by a value of 3/2 (thus obtaining the value $3A^2/4$), and multiplying at multiplier 196 the scaled d.c component by the output of the primary IIR 130a. In this manner, while the signal from phase detector 124 is being used as an input into coefficient updates 128b and 128c, the harmonics of the phase jitter are supplied to the summing junction inputs of respective IIR filters 130b and 130c to permit the filters to properly train on the respective harmonics.

There has been described and illustrated herein a multiharmonic adaptive phase jitter compensator for a modem. While a particular embodiment has been described it is not intended that the invention be limited thereby as it is intended that the invention be broad in scope and that the specification be read likewise. Thus, for example, while particular harmonic derivation means were provided for generating second and third phase jitter harmonics for training the second and third IIR filters, it will be appreciated that other harmonic derivation means such as a Hilbert transformer means with corresponding trigonemetrical relationships could be utilized to accomplish the same. Therefore, it will be apparent to those skilled in the art that additional modifications can be made to the described invention without deviating from the scope of the invention as so claimed.

I claim:

1. A multiharmonic adaptive phase jitter compensator, comprising:
   (a) a primary filter means having an input, a coefficient update means, and an output, wherein said primary filter means is arranged to receive at its input and at its coefficient update means an error signal from a phase detector which compares an equalized phase corrected signal entering a decision means with a signal exiting the decision means, and wherein said primary filter means is arranged to adaptively provide at its output a first jitter signal indicative at least of the fundamental phase jitter frequency of the signal entering the decision means;
   (b) harmonic derivation means coupled to the output of said primary filter means for obtaining said jitter signal indicative of said fundamental phase jitter frequency and for providing therefrom at least one adapted signal indicative of at least one higher harmonic of said fundamental phase jitter frequency;
   (c) at least one secondary filter means, each secondary filter means having an input, a coefficient update means, and an output, wherein a particular adapted higher harmonic signal corresponding to a particular secondary filter means is provided to said input thereof, and wherein said error signal is provided to said coefficient update of each secondary filter means; and
   (d) summation means coupled to the outputs of said primary and secondary filter means for summing said outputs thereof and for applying said sum to a multiplier which multiplies functions of said sum with equalized signals to provide phase correction of an equalized signal which is sent to said decision means.

2. A multiharmonic adaptive phase jitter compensator according to claim 1, wherein:
   said primary and secondary filter means are infinite impulse response filters.

3. A multiharmonic adaptive phase jitter compensator according to claim 2, wherein:
   each of said infinite impulse response filters comprises a finite impulse response filter having a summing junction input and an output, feedback from said finite impulse response filter output to said summing junction input, and a said coefficient update means.

4. A multiharmonic adaptive phase jitter compensator according to claim 3, wherein:
   said at least one secondary filter means comprises at least a second and a third infinite impulse response filter, wherein said second infinite impulse response filter is provided at its summing junction with a first adapted higher harmonic signal from said harmonic derivation means, and said third infinite impulse response filter is provided at its summing junction with a second adapted higher harmonic signal from said harmonic derivation means.

5. A multiharmonic adaptive phase jitter compensator according to claim 1, wherein:
   said harmonic derivation means comprises first multiplication means for multiplying said jitter signal indicative of said fundamental phase jitter by itself to provide a first alternating current (a.c.) signal and a first direct current (d.c.) signal, and a filtering means for substantially eliminating said d.c. signal from said a.c. signal, to provide said first a.c. signal indicative of said first adapted higher harmonic of said fundamental phase jitter.

6. A multiharmonic adaptive phase jitter compensator according to claim 5, wherein:
   said harmonic derivation means further comprises
   second multiplication means for multiplying said first a.c. signal and first d.c. signal by said jitter signal indicative of said fundamental phase jitter to obtain a third harmonic a.c. signal and a second a.c signal,
   a second filtering means for substantially eliminating said first a.c. signal from said first d.c. signal,
   a third multiplication means for multiplying said first d.c. signal by a constant to provide a scaled d.c. signal,
   a fourth multiplication means for multiplying said scaled d.c. signal by said jitter signal indicative of said fundamental phase jitter to obtain a third a.c. signal, and
   a summing means for summing said third harmonic a.c. signal, said second a.c. signal and said third a.c. signal to provide said third harmonic a.c. signal.

7. A multiharmonic adaptive phase jitter compensator according to claim 4, wherein:
   said harmonic derivation means comprises first multiplication means for multiplying said jitter signal indicative of said fundamental phase jitter by itself to provide a first alternating current (a.c.) signal and a first direct current (d.c.) signal, and a filtering means for substantially eliminating said d.c. signal from said a.c. signal, to provide said first a.c. signal indicative of said first adapted higher harmonic of said fundamental phase jitter, second multiplication means for multiplying said first a.c. signal and first d.c. signal by said jitter signal indicative of said fundamental phase jitter to obtain a third harmonic a.c. signal and a second a.c. signal, a second filtering means for substantially eliminating said first a.c. signal from said first d.c. signal, a third multiplication means for multiplying said first d.c. signal by a constant to provide a scaled d.c. signal, a fourth multiplication means for multiplying said scaled d.c. signal by said jitter signal indicative of said fundamental phase jitter to obtain a third a.c. signal, and second summation means for summing said third harmonic a.c. signal, said second a.c. signal and said third a.c. signal to provide said third harmonic a.c. signal.

8. A multiharmonic adaptive phase jitter compensator according to claim 1, wherein:

said summation means further comprises means for providing the cosine and sine function of said sum of said outputs, wherein said sine and cosine of said sum are multiplied with said equalized signals to provide phase correction for an equalized signal which is sent to said decision means.

9. A multiharmonic adaptive phase jitter compensator according to claim 4, wherein:

said summation means further comprises means for providing the cosine and sine function of said sum of said outputs, wherein said sine and cosine of said sum are multiplied with said equalized signals to provide phase correction for an equalized signal which is sent to said decision means.

* * * * *